United States Patent [19]

Fradenburgh

[11] 4,212,588
[45] Jul. 15, 1980

[54] SIMPLIFIED ROTOR HEAD FAIRING

[75] Inventor: Evan A. Fradenburgh, Fairfield, Conn.

[73] Assignee: United Technologies Corporation, Hartford, Conn.

[21] Appl. No.: 904,956

[22] Filed: May 11, 1978

[51] Int. Cl.² .............................................. B64C 27/38
[52] U.S. Cl. ................... 416/141; 244/17.27; 416/244 R; 416/245 R; 416/145
[58] Field of Search ............. 416/245 R, 145, 134 A, 416/138 A, 244 R, 141; 244/17.27, 17.11

[56] References Cited

U.S. PATENT DOCUMENTS

| | | | |
|---|---|---|---|
| 1,982,113 | 11/1934 | Larsen | 244/17.27 |
| 2,068,617 | 1/1937 | Wilford et al. | 416/245 X |
| 2,988,155 | 6/1961 | Armstrong | 416/245 |
| 3,008,671 | 11/1961 | Schneiter | 244/17.27 |
| 3,056,456 | 10/1962 | Michel et al. | 416/245 X |
| 3,217,811 | 11/1965 | Hibyan et al. | 416/245 X |
| 3,331,444 | 7/1967 | Toner | 416/245 |
| 3,393,750 | 7/1968 | You | 416/245 X |
| 3,470,962 | 10/1969 | Cure | 416/141 X |
| 3,540,809 | 11/1970 | Paul et al. | 416/145 X |
| 3,764,230 | 10/1973 | Rybicki et al. | 416/134 A |

FOREIGN PATENT DOCUMENTS

| | | | |
|---|---|---|---|
| 1262783 | 3/1968 | Fed. Rep. of Germany | 244/17.27 |
| 2709199 | 9/1977 | Fed. Rep. of Germany | 416/141 |
| 811394 | 4/1937 | France | 416/141 |
| 1277458 | 10/1961 | France | 244/17.27 |

Primary Examiner—Everette A. Powell, Jr.
Attorney, Agent, or Firm—Vernon F. Hauschild; Maurice B. Tasker

[57] ABSTRACT

A helicopter main rotor has an improved fairing enclosing the rotor hub and blade root area for drag and vibration reduction purposes. The fairing has peripheral cutouts through which the blades project provided with rounded lips on the rim of the cutouts to streamline air flowing in and out of the fairing through the cutouts. Internal partitions divide the fairing into chambers, each of which subtends one cutout, thus preventing flow of air through the fairing and attendant drag caused thereby. The rotor pylon is provided with a well through which the rotor drive shaft projects having a rounded lip adjacent the fairing to produce streamline airflow out of the well.

8 Claims, 5 Drawing Figures

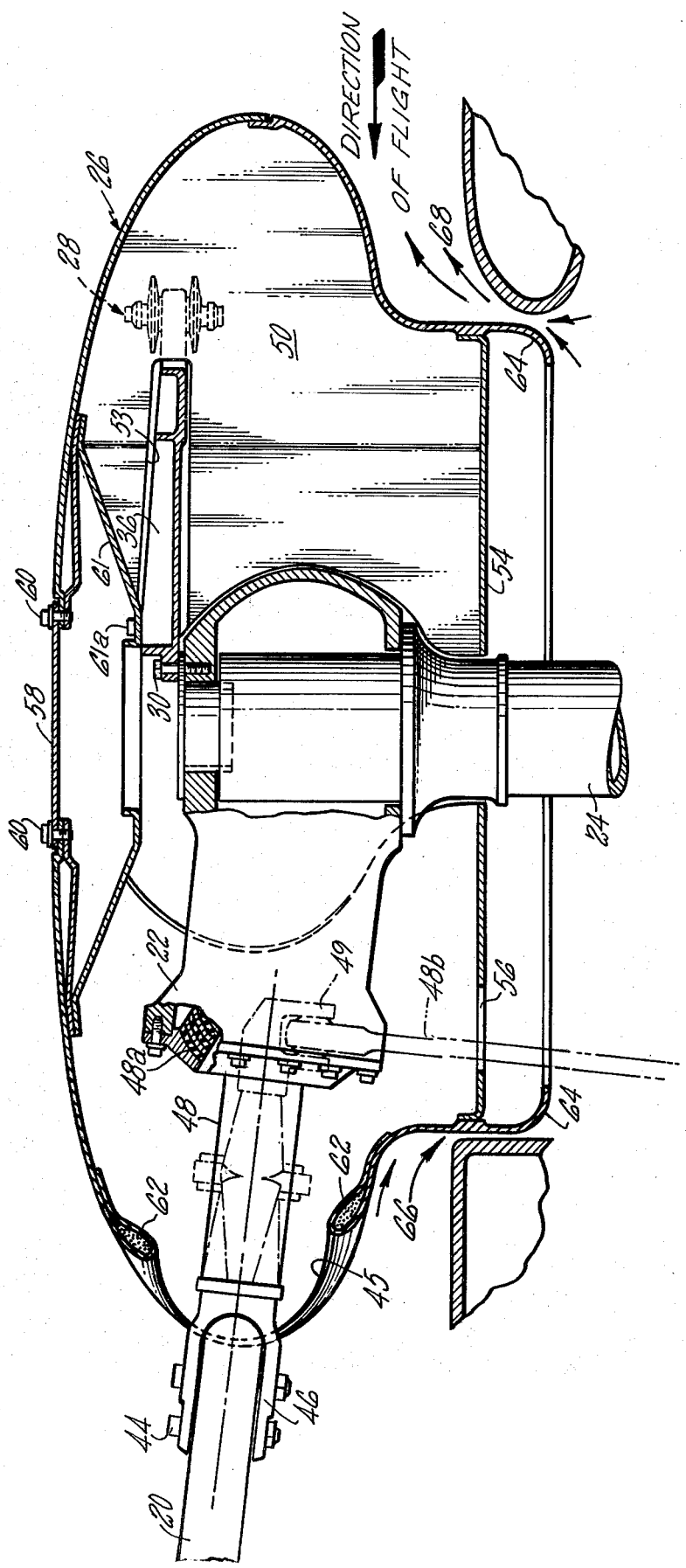

SIMPLIFIED ROTOR HEAD FAIRING

BACKGROUND OF THE INVENTION

1. Field of the Invention

This invention relates to an improved rotor head fairing for a helicopter main rotor which encloses the rotor hub and blade root area and the supports for in-plane vibration control devices such as bifilar absorbers.

2. Description of the Prior Art

Prior rotor head fairings have been complex and relatively heavy. Further, since the blade cutout holes have to be sized to accommodate anticipated flapping and lead-lag movements, excessive airflow internal of the fairing resulted so that the reduction in airflow turbulence provided by the fairing was not significant. In attempting to overcome these difficulties, prior fairings have been made with boots enclosing the blade roots at the openings, or sliding surfaces have been provided, thus presenting wear problems and adding weight to these rotating parts. U.S. Pat. Nos. 3,008,671, 3,056,456, 3,101,929, 3,130,942, 3,310,120 and 3,217,811 are representative of the rotor head fairing prior art and it will be noted that none of these patents includes a compartmented rotor head fairing construction.

SUMMARY OF THE INVENTION

A primary object of this invention is to reduce parasite drag and turbulence in the rotor hub and blade root area with a minimum of added weight and complexity.

Another object of this invention is to provide support for and eliminate drag of rotor head mounted vibration control devices, such as bifilar absorbers, by including these absorbers within the fairing and out of through air flow.

A further object of this invention is to provide means for supporting the bifilar absorbers directly on fairing structure, thus eliminating the usual hub supported radial arms for these bifilar absorbers.

A still further object of this invention is to provide an improved fairing of this type which cooperates with a rounded lip on the main rotor pylon to eliminate drag and turbulence in the air flowing between the fairing and the pylon.

These and other objects and advantages of the improved fairing will become obvious from the following detailed description of two illustrated forms of the invention.

BRIEF DESCRIPTION OF THE DRAWINGS

FIG. 2 is an enlarged sectional elevation of the fairing of FIG. 1 and parts of the adjacent pylon;

DESCRIPTION OF THE PREFERRED EMBODIMENT

Figure 1:
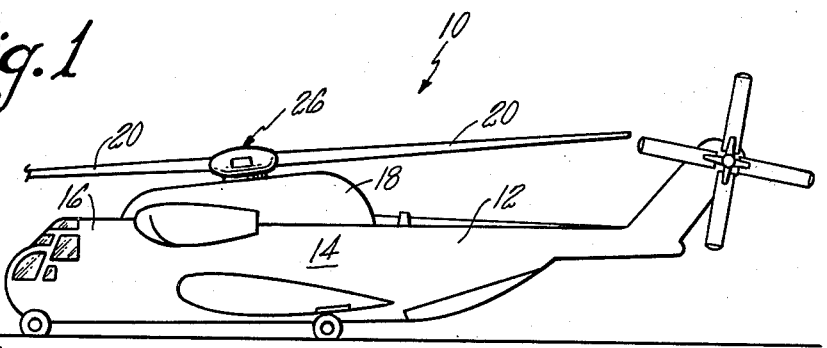
FIG. 1 is a side view of a helicopter equipped with the improved fairing of this invention.

In FIG. 1 a helicopter generally indicated at 10 has a fuselage 12 enclosing a passenger or cargo compartment 14 and a pilot compartment 16. A main rotor located above a rotor pylon 18 has blades 20 which are attached at their root ends to a rotor hub 22 (FIG. 2) at the upper end of rotor drive shaft 24.

The improved rotor head fairing 26 of this invention is mounted at the upper end of drive shaft 24 and encloses rotor hub 22 and the root ends of blades 20 at their points of attachment to the hub. Fairing 26 also encloses bifilar absorber assembly 28 (FIG. 3) which is attached to the extremity of hub 22 above blades 20 by cap screws 30, one of which is shown in FIG. 2.

Assembly 28 includes a star-shaped support member which has central ring member 34 positioned concentrically about the axis of rotation of hub 22 with star point arms 36 projecting radially therefrom and equally spaced circumferentially about the rotor axis in a plane perpendicular to this axis.

Each radially extended arm 36 has two circular apertures 38 located side-by-side and the pendulous member 40 has two similar apertures 42 which overlap apertures 38. Roll pins 44 in apertures 38 and 42 connect member 40 to arm 36 for pendulous movement relative to arm 36. These absorbers per se form no part of this invention and reference is made to U.S. Pat. No. 3,540,809, issued Nov. 17, 1970 to W. F. Paul et al for a detailed description of these bifilar absorbers.

Fairing 26 has four peripheral cutouts 45 through which the blades extend, four blades being provided in the rotor of the helicopter shown. Each blade is secured by bolts 44 to blade cuff 46 of spindle 48 (FIG. 2) which is mounted in the rotor hub on an elastomeric bearing 48a which provides for the usual pitch change, flapping and lead-lag movements of the blade in flight. Pilot control of the blade pitch is provided by push-pull linkage 48b attached to blade horn 49. A complete disclosure of the elastomeric bearing is contained in U.S. Pat. No. 3,759,632, issued Sept. 18, 1973 to Robert C. Rybicki and reference is made to this patent for details of this bearing.

Cutouts 45 are sized to accommodate these pitch flapping and lead-lag movements of the blades and an important aspect of this invention is the structure for dealing with the air entering through these cutouts during the forward movement of the helicopter in flight. In the past a simple fairing has not provided significant drag reduction because the relatively large cutout holes permit excessive internal airflow through the fairing which, due to the high drag in the blade hub and blade root area, results in turbulence and unacceptable drag.

Figure 3:
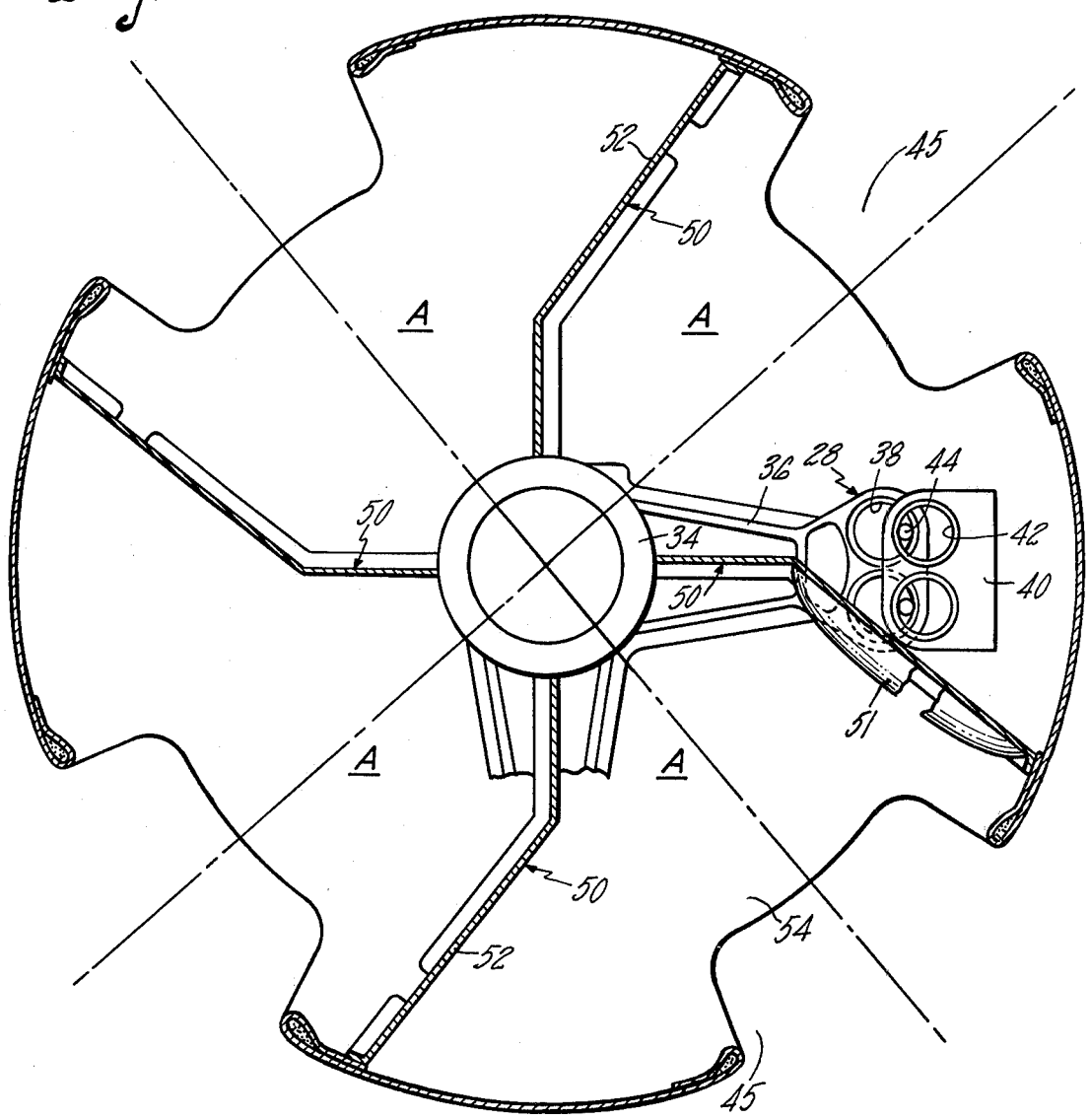
FIG. 3 is a sectional plan view of the fairing taken just above the bifilar absorbers.

The improved fairing of this invention eliminates internal drag by providing simple partitions 50 within the fairing which provide a separate chamber A that subtends each cutout and prevents air entering one chamber from flowing out of the fairing through another chamber. As shown in FIG. 3 the partitions are generally radial although due to the pendular movements of weights 40 of the bifilar absorbers 28 and the partitions 50 are directed out of the radial planes at 52 to provide clearance for weights 40. Considerable freedom is possible in locating these partitions as long as they extend from the rotor hub to the periphery of the fairing between adjacent cutouts. However, in the location of these partitions 50, as shown in FIGS. 2 and 3, it is necessary to cut slots 53 in the partitions to accommodate star point arms 36 of bifilar assembly 28. This slot 53 can be sealed, if desired, by auxiliary surfaces (not shown) added to the basic partition 50, or can be left with a small gap since a small open area will not degrade the operation of the fairing system significantly.

As best shown in FIG. 3, partition 50 is fabricated to include bubble 51 to accommodate the motion of bifilar vibration damper 28. An annular bottom plate 54 (FIG. 2) is provided which extends from the rotor hub to the periphery of fairing 26. This plate has openings 56 for the pilot operated blade pitch changing rods 48b, one of which is provided for each blade and is attached to the blade horn 49 of its respective blade.

Access to the rotor head for service is possible by removing the cover plate 58 which is secured to the fairing by cap screws 60. The upper ends of partitions 50 abut a conical member 61 which is attached to the central ring member 34 of vibration absorber assembly 28 by cap screws, one of which is shown at 61a in FIG. 2, and otherwise abut the inside surface of fairing member 26.

In order to reduce turbulence in the air flowing into and out of the cutouts 45 the edges of the cutouts are thickened and curved at 62 in a well known manner. To further reduce the drag in the vicinity of the fairing, the latter is provided with a curved lip 64 at its lower periphery adjacent the opening in pylon 18 to prevent turbulence in the airstream entering the pylon at 66 and leaving at 68.

In the operation of the improved fairing of FIGS. 1–3, air entering a chamber A through a blade cutout due to the advance of the helicopter in flight is prevented from flowing through the fairing and leaving through another cutout. Instead, as the fairing rotates the air trapped in the chamber will spill out and flow over the streamlined edges 62 of the cutout without turbulence and without creating excessive drag. Another advantage of this improved fairing construction is that it provides support for and eliminates drag due to the presence of rotor-head-mounted vibration absorbers.

Figure 4:
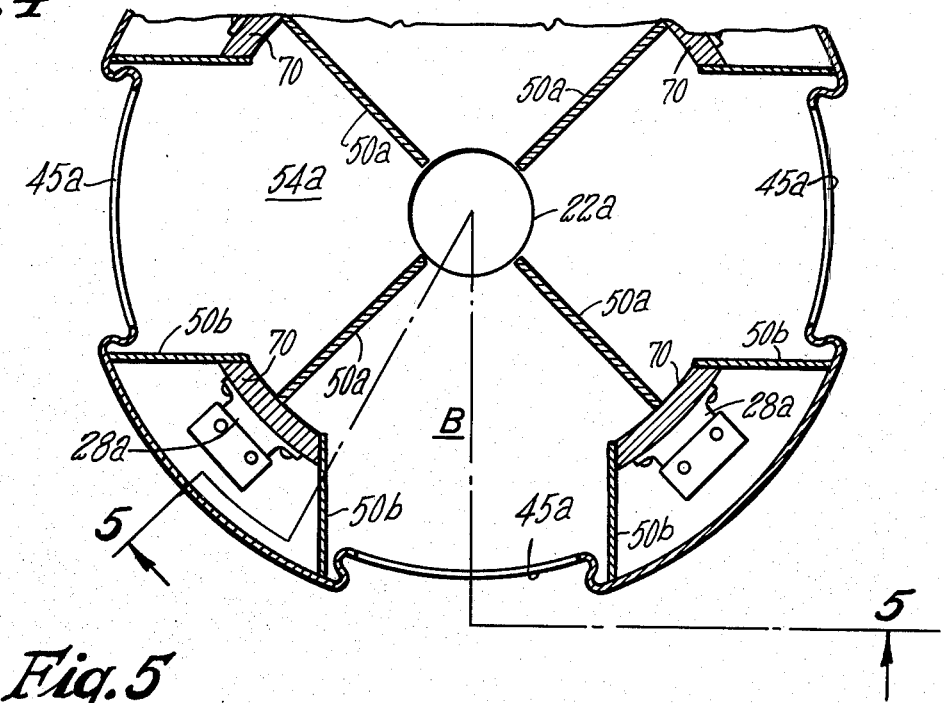
FIG. 4 is a section of a modified fairing taken on line 4—4 of FIG. 5.
Figure 5:
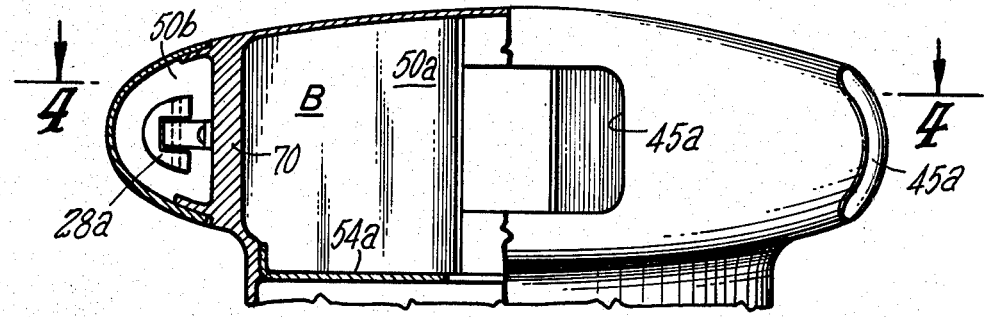
FIG. 5 is a section on line 5—5 of FIG. 4.

In FIGS. 4 and 5 a modified construction has been shown for supporting the bifilar absorbers. In this construction the fairing has been provided between adjacent blade cutouts 45a with four integral vertical partitions 70 on the outer wall of which bifilar assemblies 28a are mounted. Four radial partitions 50a extend from partitions 70 to rotor hub 22 a and two short partitions 50b extend from the ends of each partition 70 to the outer fairing wall. A bottom closure plate 54a is provided to complete the closure of the compartments B. The operation of this form of the invention will be obvious from the description in connection with FIGS. 1–3.

It will be evident from the above description that, as a result of the improved fairing, the parasite drag of the rotor hub and blade root area has been eliminated with a minimum of added weight and complexity. It has also provided support for and eliminated drag of rotor head mounted vibration control bifilar absorbers. These advantages have been possible without the use of sliding surfaces or boots for enclosing the blade cutouts of the prior art.

I wish it to be understood that I do not desire to be limited to the exact details of construction shown and described for obvious modifications will occur to a person skilled in this art.

I claim:

1. A fairing for enclosing the main rotor head of a multi-bladed helicopter comprising an annular streamlined member providing a chamber for said rotor head, said fairing having a plurality of peripheral cutouts, one for each blade of the rotor, and means in said chamber for preventing air which enters said chamber through one of said cutouts due to forward movement of the helicopter in flight from flowing out of said chamber through another of said cutouts, said means comprising a plurality of partitions which divide said chamber into non-communicating compartments, each of which has only one of said cutouts.

2. A fairing for enclosing the main rotor head of a multi-bladed helicopter comprising an annular streamlined member providing a chamber for said rotor head, said fairing having a plurality of peripheral cutouts, one for each blade of the rotor, means in said chamber for preventing air which enters said chamber through one of said cutouts due to forward movement of the helicopter in flight from flowing out of said chamber through another of said cutouts, said means comprising a plurality of partitions which divide said chamber into non-communicating compartments, each of which has only one of said cutouts, and means for providing streamlined airflow into and out of said compartments comprising thickened curved lips for said cutouts at the periphery of said fairing.

3. A fairing for enclosing the main rotor head of a multi-bladed helicopter rotor comprising an annular streamlined member providing a chamber for said rotor head, said fairing having a plurality of peripheral cutouts of sufficient size to permit all lead-lag and flapping movements of said blades encountered in flight, one for each blade of the rotor, and means in said chamber for preventing air which enters said chamber through one of said cutouts due to forward movement of the helicopter in flight from flowing through said chamber and out through another of said cutouts, said means comprising a plurality of partitions which divide said chamber into compartments, each of which subtends one of said blade cutouts.

4. In a helicopter, a fuselage having a rotor pylon, a rotor drive shaft extending above said pylon, a rotor head at the upper end of said shaft, a plurality of rotor blades extending from said rotor head, means for attaching said blades to said rotor head permitting flapping and lead-lag movements of said blades, a fairing enclosing said rotor head and said blade attaching means, said fairing having a substantially elliptical vertical cross section forming a chamber for said rotor head and having a peripheral cutout for each blade through which said blade extends, said cutouts being sized to accommodate all of the flapping and lead-lag movements of said blades encountered in flight, and means for dividing said fairing chamber into a plurality of isolated compartments, each of which has one only of said blade cutouts in its exterior wall, comprising a plurality of generally radial partitions which extend from said rotor head to the periphery of said fairing and intersect said periphery at points between adjacent blade cutouts.

5. In a helicopter, a fuselage having a rotor pylon, a rotor drive shaft extending above said pylon, a rotor head at the upper end of said shaft having a plurality of blades extending radially therefrom, said blades being mounted on said rotor head for flapping and lead-lag motions, a fairing member carried by said rotor head forming an annular chamber, said fairing member having peripheral cutouts through which said blades extend, said cutouts having sufficient size to permit all lead-lag and flapping movements of said blades encountered in flight and generally radial partition means located in said fairing chamber between adjacent blades for dividing said chamber into non-communicating compartments, each having a blade cutout in its outer wall.

6. In a helicopter, a fuselage having a rotor pylon, a rotor shaft extending above said pylon, a rotor head at the upper end of said shaft having a plurality of rotor blades extending radially therefrom, said blades supported on said rotor head for lead-lag and flapping movements, and an annular fairing member carried by said rotor head forming a chamber elliptical in vertical cross section, said fairing member having peripheral blade cutouts through which said blades extend of sufficient size to accommodate all lead-lag and flapping movements encountered in flight, and means for dividing said chamber into closed compartments each having one blade cutout in its outer wall, said means including radial partition means in said chamber which extend from said rotor head to the peripheral wall of said fairing member between adjacent peripheral cutouts.

7. The combination of claim 6 in which the radial partition means defines small compartments adjacent the peripheral wall of the fairing member, and bifilar vibration absorbers are mounted in said smaller compartments on a wall of said partition means which lies parallel with the peripheral wall of said fairing member.

8. A fairing member for enclosing the rotor head of a helicopter multi-bladed main rotor comprising a streamlined member providing a chamber of elliptical cross section in vertical section, said fairing member having a plurality of pheripheral cutouts, one for each blade of the rotor, and means for preventing air which enters said chamber through any one of said cutouts due to forward movement of the helicopter in flight from flowing through said chamber and out through another of said cutouts, said means comprising partition means which divide said chamber into compartments, each of which includes one only of said cutouts, said partition means including chordwise partitions spaced from the periphery of said fairing member forming a plurality of smaller compartments, and vibration absorbers mounted in said smaller compartments on said chordwise partitions.

* * * * *